United States Patent

Khatiblou

Patent Number: 5,485,765
Date of Patent: Jan. 23, 1996

[54] CONNECTING ROD WITH IMPROVED FATIGUE LIFE

[76] Inventor: Mohsen A. Khatiblou, 26522 Meadow Crest, Laguna Hills, Calif. 92653

[21] Appl. No.: 184,505

[22] Filed: Jan. 19, 1994

[51] Int. Cl.⁶ .................................... F02B 75/32
[52] U.S. Cl. ..................... 74/579 E; 74/579 R
[58] Field of Search ............. 29/446; 74/579 E, 74/579 R; 123/197.3, 197.4; 411/14, 383, 395

[56] References Cited

U.S. PATENT DOCUMENTS

| | | | |
|---|---|---|---|
| 3,238,811 | 3/1966 | Longstreth | 74/579 E |
| 3,482,467 | 12/1969 | Volkel | 74/579 R |
| 3,677,107 | 7/1972 | Strebel et al. | 74/579 R |
| 4,391,161 | 7/1983 | Ban et al. | 74/579 E |
| 4,425,820 | 1/1984 | Swozil | 74/579 R |

FOREIGN PATENT DOCUMENTS

| | | | |
|---|---|---|---|
| 669105 | 7/1979 | U.S.S.R. | 74/579 E |
| 985089 | 1/1983 | U.S.S.R. | 29/446 |
| 8604122 | 7/1986 | WIPO | 74/579 E |

*Primary Examiner*—Rodney H. Bonck
*Assistant Examiner*—Mary Ann Battista

[57] ABSTRACT

An automotive connecting rod made with lightweight alloy such as aluminum, having substantially improved durability and fatigue strength without weight penalty. The fatigue life of the beam section connecting two ends of the rod is increased by providing a special small bolt made with a very high tensile strength material, such as steel, built into the beam section to provide more favorable cyclic load variation at that region. A proper preload is provided to the bolt. The bolt size, its preload, and cross-sectional area of the beam section is calculated by an optimization method which includes the steps of taking into consideration the strength and fatigue characteristics of the lightweight alloy and bolt material used, as well as engine parameters such as stroke, rod length, piston and rod weight, operating temperature and RPM.

4 Claims, 1 Drawing Sheet

SEC. A-A

CONNECTING ROD WITH IMPROVED FATIGUE LIFE

BACKGROUND OF THE INVENTION

1. Field of the Invention

The invention relates generally to connecting rods and, more particularly, to a hybrid connecting rod made of a light alloy material and a second fatigue life strengthening means for use in internal combustion engines.

2. Description of Related Art

Steel is normally used for construction of automobile connecting rods because of its strength, durability, and lower cost. However, steel with its high mass density exerts excessive stresses on the crankshaft of a high speed engine. This in turn requires a heavier crankshaft for carrying the loads and, therefore, the maximum RPM of the engine is limited. Additionally, higher inertia loads, such as those caused by steel connecting rods and heavier crankshafts reduces the acceleration or declaration rates of engine speed. Therefore, light alloy metals such as aluminum and titanium are currently being used in high speed engine connecting rods to circumvent the above-mentioned problems. Titanium has better mechanical properties than aluminum, at the expense of higher density and cost. This higher density and cost have made aluminum connecting rods more popular and attractive. However, they suffer from relatively low strength and fatigue life.

Particulates such as SiC, Alumina, and a variety of chopped fibers in an aluminum matrix are being used, with limited success, to improve the strength and stiffness of aluminum connecting rods. High modules and strength carbon fibers are the most desirable reinforcements that can be used. In this connection, U.S. Pat. No. 4,425,820 discloses a design with such fibers for construction of a connecting rod. The carbon fibers in the connecting rod of this patent are the primary load carrying member and the aluminum is primarily a casing for those fibers. Proper adherence of fibers to aluminum, inherent weakness due to casting, the shrinkage of aluminum after pouring causes wrinkling of the fibers, and the residual stresses caused thereby are practically insurmountable problems with such carbon fiber containing aluminum connecting rods.

A further prior art connecting rod design is shown in U.S. Pat. No. 4,391,161 which discloses how the buckling capability of a connecting rod used in large long stroke engines can be improved without enlargement of the beam section by the inclusion of stainless steel fibers in the beam flanges. Buckling capability of a connecting rod in a high speed engine is of far less concern. Also, the aforementioned problems with carbon fiber design connecting rods still remain, as well as additional problems with the stress concentration introduced in the aluminum by the ends of the long steel fibers.

In addition to the above, the known prior art designs, even though conceptually sound, have further weaknesses and drawbacks as far as ease of manufacturing is concerned. Therefore, there still exists a long felt need in the art for a durable, low cost connecting rod, that is substantially easy to manufacture and which will stand up to sustained use in today's modern, high speed internal combustion engines, such as those used in automobiles.

SUMMARY OF THE INVENTION

Accordingly, it is a general object of the present invention to provide an improved connecting rod for an engine.

It is a particular object of the present invention to provide a more durable connecting rod made from a lightweight alloy.

In accordance with one aspect of the present invention, there is provided an improved automotive connecting rod made from a lightweight alloy, such as aluminum, which has substantial durability, by the provision of a high tensile strength material rod means, in the beam section of the connecting rod. The rod size, a preload to be applied to the rod, and the cross-sectional area of a beam section is calculated by a disclosed method which includes the steps of taking into consideration the strength and fatigue characteristics of the lightweight alloy and rod material used, as well as engine parameters of the internal combustion engine in which the connecting rod is to be used.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for the description of an improved connecting rod, generally indicated at 10.

Figure 1:
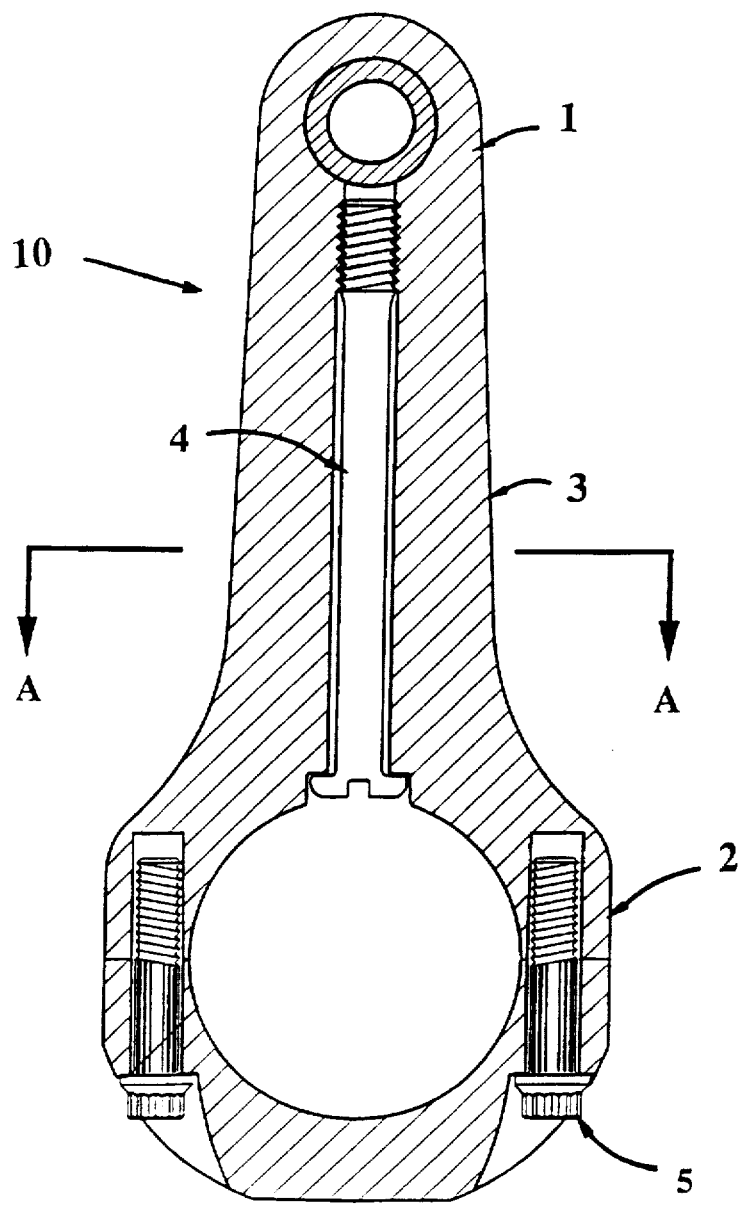
FIG. 1 is a front cross-sectional view, passing through the center of a connecting rod of the present invention.

As shown in FIG. 1, an automotive connecting rod 10 of the present invention consists of a body, preferably made from a lightweight alloy, such as aluminum, having a small end 1; for supporting piston wrist pin, big end 2, having cap bolts 5, for attaching the assembly to a crankshaft, not shown; a beam or rod section 3, connecting the two ends 1 and 2 together; and a central strengthening bolt or rod 4, threadedly secured into an internal threaded opening formed adjacent the small end 1. As is known to those skilled in the art, the beam section 3 of a connecting rod is the most prone to failure, due to fatigue loading during normal operation. This beam section 3 also contains a significant portion of the total mass of the connection rod 10 and, therefore, a noticeable weight saving can be achieved by a small amount of reduction in its cross-sectional area. However, any reduction in cross-section of the beam section 3 must not sacrifice its fatigue life. Some understanding of the fatigue behavior of metals, such as aluminum or other alloys, is required for the discussion that follows. A general explanation of such fatigue is provided hereinafter. Fatigue is the phenomena whereby materials subjected to cyclic loading will fail at much lower load levels than their ultimate tensile or compressive strength levels. Fatigue life expectancy increases as the mean load is decreased for the same amplitude of variation. For example, a 7075 T6 Aluminum will last eight times longer in a cyclic load environment with a stress concentration factor Kt=1.6 and an amplitude of variation of 11.7 Psi, when the mean load is decreased from 3.6 Psi to zero Psi.

The maximum tension force created by the reciprocating masses, is greater than the maximum compression force in internal combustion piston engines, due to the kinematics involved, and thus results in a positive mean value. The critical areas of the two ends of a connecting rod will experience primarily tension forces and, therefore, they are subjected to load variation with about one half the amplitude of the beam section. The beam section carries both tensile and compressive loads. This undesirable loading cycle makes the beam section the most highly fatigue critical section of the connecting rod and, thus, it is usually where failures occur. In the discussion that follows details of the present invention relating to improvement of the fatigue strength of the beam section will be discussed. In summery, the goal of the present invention was achieved by a hybrid design where the materials used are subjected to a more favorable cyclic load variation, rather than being purely reinforced by exotic means. The hybrid design of the present invention utilizes a proper combination of two metals, such as aluminum and steel, so that better results may be obtained than, if either of metals were used alone. This is done by the detailed examination of loads and failure phenomenon.

Connecting rod failure most often occurs during a non-firing cycle, when the connecting rod is subjected to maximum tensile forces due to catastrophic growth of flaws that were created and grown to a critical size during prior cycles. Maximum tension forces in a connecting rod are created when a piston attached thereto is at top dead center ("TDC"). Similarly, maximum compressive force is generated during the piston approach to the bottom dead center ("BDC"). But compressive magnitude is less than that of maximum tension because of the kinematics involved. For example, compressive stress is about fifty percent (50%) lower in an engine with a connecting rod length to stroke ratio of 1.56, resulting in a positive mean value of twenty five percent (25%) of the maximum tension value. This is very unfortunate since zero or a negative compressive mean stress, with the amplitude of variation, would have been less damaging and longer connecting rod life would result.

Figure 2:
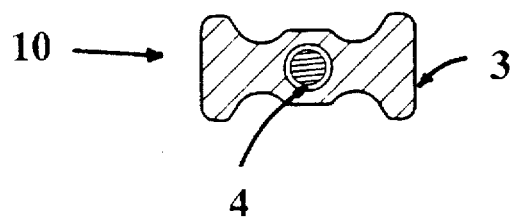
FIG. 2 is a sectional view of the beam cross-section of the connecting rod, taken along line A—A of FIG. 1.

It has been found, that by lowering the mean stress to near zero, or to a slightly negative value, and thereby increasing fatigue life without increasing the weight of the connecting rod, a longer lasting connecting rod is achieved. In the present invention, this is accomplished by the inclusion of the central bolt 4 in an opening formed through the center of the beam section 3. This bolt 4 is preferably fabricated from a high strength material, such as steel, and is provided with a proper preload, as by applying torque thereto. The preferred tensile strength of the bolt material is 200,000 Psi or greater. Because of the use of the bolt 4, a smaller cross-sectional area of the beam section 3 is possible, compared to the beam cross-section of a standard design, without the bolt. The resulting weight saving is at least equal to, or greater than, the added weight of the bolt, depending upon the desired life expectancy. This configuration and the cross-sectional area of the beam section are shown in FIGS. 1 and 2 of the drawings.

Selection of the bolt size, its preload, and cross-sectional area of the beam section is an iterative optimization problem that needs to be solved for each individual application. It involves a method which must take into consideration the following parameters: stroke, rod length and weight, piston weight, maximum RPM, operating temperature, and fatigue and strength characteristics of the selected materials. Additionally, it is important that the force created by the mismatch in thermal expansion coefficient of materials (such as aluminum and steel) be added to that created by the applied torque when calculating bolt preload. Otherwise, excessive compression in the beam section 3 or tension in the bolt 4 will result, causing earlier than expected failure. The following is an example of an actual case illustrating the merits of the invention:

EXAMPLE

Calculated endurance of a standard aluminum rod with a beam cross sectional area of one square inch operating in an engine with the following parameters will be used as a base line for purpose of comparison with the connecting rod of the present invention:

1 Piston+Pin weight=750 Grams.
2 Small end weight=182 Grams.
3 Beam cross sectional area without center hole=1 Inch square.
4 Center to center distance of the connecting rod =6.25 Inches.
5 Stroke=4 Inches.
6 Engine RPM=10,000.
7 Operating temperature=200 F.
8 Rod material=7075 T6 Aluminum Under these conditions, the beam section of a standard connecting rod experiences a maximum nominal tension and compression stresses of 15.3 and −8.1 Psi, respectively, and will have a life expectancy of approximately 6.7 million cycles with Kt=1.6, or 10.5 million cycles with Kt=1. Detail stress analysis is required for evaluation of the actual value of Kt; but Kt=1.6 is a reasonable and conservative value for initial evaluations. A similar life expectancy will be obtained from beam section 3, described in this application, having a cross sectional area of 0.64 square inches with a hole for a 5/16" bolt therein, with the bolt having an initial preload of 1100 lbs. The preload on the bolt will increase to about 2600 lbs., at the operating temperature of 200 F. This hybrid beam section, however, weighs 10% less than that of the standard design using aluminum. In this example, stresses vary between 13.3 and −13.3 Psi with a mean stress of zero, and the life of a bolt made out of high strength 4340 steel will be greater than 8 million cycles. Even a lighter or more durable section can be made by designing for negative mean stress. But fatigue data for that type of loading are generally not available and some testing would be required.

A beam section 3 with an area of 0.72 square inches with the same size hole and a 0.35" diameter bolt will have a similar weight of as the above-mentioned standard design, but will have roughly twenty times higher fatigue life at the same operating condition, or the maximum speed of the engine may be increased to 10,700 RPM for the same life expectancy. In this case an initial preload of 650 lbs in the bolt would be required.

These improvements in the connecting rod life and fatigue strength, and the desired objectives are achieved, amongst other things, by providing a preload to the bolt 4, as by applying a torque thereto, as well as by the force created by the mismatch in the thermal expansion coefficient of the materials at engine operating temperature. As noted above the magnitude of initial preload is application dependent. The present invention allows the aluminum body of the connecting rod to carry most of the compressive loads while the damaging tensile forces are shared properly by the aluminum body and the pre loaded bolt 4, according to the material characteristics of the two materials used for these items.

The indicated sizes for the bolt 4 and beam section 3 cross-sectional area set forth in the above example are for purpose of illustration of the concept only, and are not to be construed to limit the invention. However, as shown in the illustrative example, sizing should be done by an iterative optimization method or process taking into account the selected materials used, and the operating conditions of the engine, in which the designed connecting rod is to be placed. Stress concentrations due to the treads cut in the internal opening near the small end are of no concern since the tensile stress at the area directly below the piston wrist pin where the treads are cut, are very small.

Known methods of manufacturing may be utilized to fabricate the connecting rod of the present invention, such as those known to persons skilled in the field for producing high quality forged or billet rods. The head of the bolt 4 needs to be shallow, and preferably includes an opening for the insertion of an Allen type wrench because of the limited available space. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What I claim is:

1. A connecting rod for an engine having a wrist pin and a crankpin, said connecting rod comprising:

a beam member including a small end having a circular through hole for receiving the wrist pin of the engine, said beam member further including a large end having a circular through hole for receiving the crankpin of the engine;

an elongated bore centrally located within the beam member, said elongated bore extending from the circular through hole of the small end to the circular through hole of the large end, said elongated bore further including a threaded section adjacent the circular through hole of the small end;

a bolt having a threaded end and a rotational axis, wherein the threaded end is received in the threaded section of the elongated bore, and wherein the rotational axis extends through the center of the circular through hole of the small end and through the center of the circular through hole of the large end.

2. The connecting rod according to claim 1, wherein the beam member is subjected to an initial compressive preload by tensioning the bolt.

3. The connecting rod according to claim 1, wherein the beam member is manufactured from a lightweight alloy and the bolt is manufactured from a high strength material.

4. The connecting rod according to claim 3, wherein the beam member is subjected to an initial compressive preload by tensioning the bolt.

* * * * *